(12) United States Patent
Wang et al.

(10) Patent No.: US 7,790,066 B2
(45) Date of Patent: Sep. 7, 2010

(54) NANORICE PARTICLES: HYBRID PLASMONIC NANOSTRUCTURES

(75) Inventors: Hui Wang, Houston, TX (US); Daniel Brandl, Houston, TX (US); Fei Le, Houston, TX (US); Peter Nordlander, Houston, TX (US); Nancy J. Halas, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 12/281,103

(22) PCT Filed: Mar. 2, 2007

(86) PCT No.: PCT/US2007/063201

§ 371 (c)(1),
(2), (4) Date: Aug. 28, 2008

(87) PCT Pub. No.: WO2007/103802

PCT Pub. Date: Sep. 13, 2007

(65) Prior Publication Data

US 2009/0032781 A1 Feb. 5, 2009

Related U.S. Application Data

(60) Provisional application No. 60/779,166, filed on Mar. 3, 2006.

(51) Int. Cl.
*H01B 1/22* (2006.01)
*H01B 1/02* (2006.01)
*B32B 5/16* (2006.01)

(52) U.S. Cl. .................. 252/514; 252/512; 252/513; 428/403; 428/404

(58) Field of Classification Search ............... 252/514, 252/512, 513; 428/403, 404
See application file for complete search history.

(56) References Cited

U.S. PATENT DOCUMENTS

| | | | |
|---|---|---|---|
| 6,685,986 | B2 | 2/2004 | Oldenburg et al. |
| 6,778,316 | B2 * | 8/2004 | Halas et al. ............... 359/296 |
| 7,088,449 | B1 * | 8/2006 | Brongersma ............... 356/445 |
| 7,371,457 | B2 | 5/2008 | Oldenburg et al. |
| 7,524,942 | B2 * | 4/2009 | Wang et al. ............... 536/23.1 |
| 2002/0177143 | A1 * | 11/2002 | Mirkin et al. ............... 435/6 |
| 2003/0129608 | A1 * | 7/2003 | Mirkin et al. ............... 435/6 |
| 2004/0214001 | A1 | 10/2004 | Oldenburg et al. .......... 428/404 |
| 2007/0122429 | A1 * | 5/2007 | Kay et al. ............... 424/204.1 |
| 2007/0212697 | A1 * | 9/2007 | Sampson et al. ............... 435/6 |
| 2008/0066549 | A1 * | 3/2008 | Oldham et al. ............... 73/579 |
| 2009/0256116 | A1 * | 10/2009 | Shumaker-Parry et al. ............... 252/301.18 |

OTHER PUBLICATIONS

Wang et al., "Nanorice: A Hybrid Plasmonic Nanostructure", Nano Letters, 6(4), 827-832 (published on web Mar. 11, 2006).*
Foreign communication from a related counterpart application—International Search Report and Written Opinion, PCT/US07/63201, Mar. 20, 2008, 9 pages.
Jackson, J. B., "Surface-enhanced raman scattering on tunable plasmonic nanoparticle substrates," PNAS, Dec. 28, 2004, pp. 17930-17935, vol. 101, No. 52, The National Academy of Sciences of the USA.
Kneipp, Katrin, et al., "Single molecule detection using surface-enhanced raman scattering (SERS)," Physical Review Letters, Mar. 3, 1997, pp. 1667-1670, vol. 78, No. 9, The American Physical Society.
Malynych, Serhiy, et al., "Poly(vinyl pyridine) as a universal surface modifier for immobilization of nanoparticles," J. Phys. Chem. B, 2002, pp. 1280-1285, vol. 106, No. 6, American Chemical Society.
Nordlander, P., et al., "Plasmon hybridization in nanoparticle dimers," Nano Letters, 2004, pp. 899-903, vol. 4, No. 5, American Chemical Society.
Oldenburg, S. J., et al., "Nanoengineering of optical resonances," Chemical Physics Letters, May 22, 1998, pp. 243-247, vol. 288, Elsevier Science B.V.
Prodan, E., et al., "A hydridization model for the plasmon response of complex nanostructures," www.sciencemag.org, Oct. 17, 2003, pp. 419-422, vol. 302, Science.
Aizpurua, J., et al., "Optical properties of gold nanorings," Physical Review Letters, Feb. 7, 2003, pp. 057401-1 to 057401-4, vol. 90, No. 5, The American Physical Society.
Barnes, William L., et al., "Surface plasmon subwavelength optics," Nature, Aug. 14, 2003, pp. 824-830, vol. 424, Nature Publishing Group.
Duff, Daniel G., et al., "A new hydrosol of gold clusters. 1. Formation and particle size variation," Langmuir, 1993, pp. 2301-2309, vol. 9, No. 9, American Chemical Society.
Gunnarsson, Linda, et al., "Confined plasmons in nanofabricated single silver particle pairs: experimental observations of strong interparticle interactions," J. Phys. Chem. B, 2005, pp. 1079-1087, vol. 109, No. 3, American Chemical Society.

(Continued)

*Primary Examiner*—Douglas McGinty
(74) *Attorney, Agent, or Firm*—Conley Rose, P.C.; Rodney B. Carroll (57) ABSTRACT

A new hybrid nanoparticle, i.e., a nanorice particle, which combines the intense local fields of nanorods with the highly tunable plasmon resonances of nanoshells, is described herein. This geometry possesses far greater structural tunability than previous nanoparticle geometries, along with much larger local field enhancements and far greater sensitivity as a surface plasmon resonance (SPR) nanosensor than presently known dielectric-conductive material nanostructures. In an embodiment, a nanoparticle comprises a prolate spheroid-shaped core having a first aspect ratio. The nanoparticle also comprises at least one conductive shell surrounding said prolate spheroid-shaped core. The nanoparticle has a surface plasmon resonance sensitivity of at least 600 nm $RIU^{-1}$. Methods of making the disclosed nanorice particles are also described herein.

32 Claims, 7 Drawing Sheets

OTHER PUBLICATIONS

Haes, Amanda J., et al., "A nanoscale optical biosensor: sensitivity and selectivity of an approach based on the localized surface plasmon resonance spectroscopy of triangular silver nanoparticles," J. Am. Chem. Soc., 2002, pp. 10596-10604, vol. 124, No. 35, American Chemical Society.

Hartschuh, Achim, et al., "High-resolution near-field Raman microscopy of single-walled carbon nanotubes," Physical Review Letters, Mar. 7, 2003, pp. 095503-1 to 095503-4, vol. 90, No. 9, The American Physical Society.

Kreibig, Uwe, et al., "Optical properties of metal clusters," Jul. 7, 1995, 4 pages, Springer.

Link, S., et al., "Simulation of the optical absorption spectra of gold nanorods as a function of their aspect ratio and the effect of the medium dielectric constant," J. Phys. Chem. B, 1999, pp. 3073-3077, vol. 103, No. 16, American Chemical Society.

Link, Stephan, et al., "Spectral properties and relaxation dynamics of surface plasmon electronic oscillations in gold and silver nanodots and nanorods," J. Phys. Chem. B, 1999, pp. 8410-8426, vol. 103, No. 40, American Chemical Society.

Maier, Stefan A., et al., "Plasmonics—a route to nanoscale optical devices," Advanced Materials, Oct. 2, 2001, pp. 1501-1505, vol. 13, No. 19, Wiley-VCH Verlah GmbH, D-69469 Weinheim.

Maier, Stefan A., et al., "Plasmonics: localization and guiding of electromagnetic energy in metal/dielectric structures," Journal of Applied Physics, 2005, pp. 011101-1 to 011101-10, vol. 98, American Institute of Physics.

Michaels, Amy M., et al., "Ag nanocrystal junctions as the site for surface-enhanced Raman scattering of single rhodamine 6G molecules," J. Phys. Chem. B, 2000, pp. 11965-11971, vol. 104, No. 50, American Chemical Society.

Michaels, Amy M., et al., Surface enhanced Raman spectroscopy of individual rhodamine 6G molecules on large Ag nanocrystals, J. Am. Chem. Soc., 1999, pp. 9932-9939, vol. 121, No. 43, American Chemical Society.

Murphy, Catherine J., et al., "Controlling the aspect ratio of inorganic nanorods and nanowires," Advanced Materials, Jan. 4, 2002, pp. 80-82, vol. 14, No. 1, Wiley-VCH Verlag GmbH, D-69469 Weinheim.

Murphy, Catherine J., et al., "Surfactant-directed synthesis and optical properties of one-dimensional plasmonic metallic nanostructures," www.mrs.org/publications/bulletin, May 2005, pp. 349-355, vol. 30, Mrs Bulletin.

Nie, Shuming, et al., "Probing single molecules and single nanoparticles by surface-enhanced Raman scattering," Feb. 21, 1997, pp. 1102-1106, vol. 275, Science.

Oubre, C., et al., "Finite-difference time-domain studies of the optical properties of nanoshell dimers," J. Phys. Chem. B, 2005, pp. 10042-10051, vol. 109, No. 20, American Chemical Society.

Oubre, Chris, et al., "Optical properties of metallodielectric nanostructures calculated using the finite difference time domain method," J. Phys. Chem. B, 2004, pp. 17740-17747, vol. 108, No. 46, American Chemical Society.

Ozaki, Masataka, et al., "Formation of monodispersed spindle-type hematite particles," Journal of Colloid and Interface Science, Nov. 1984, pp. 146-151, vol. 102, No. 1, Academic Press, Inc.

Ozbay, Ekmel, "Plasmonics: merging photonics and electronics at nanoscale dimensions," Jan. 13, 2006, pp. 189-193, vol. 311, Science.

Prodan, E., et al., "Plasmon hybridization in spherical nanoparticles," Journal of Chemical Physics, Mar. 15, 2004, pp. 5444-5454, vol. 120, No. 11, American Institute of Physics.

Raether, Heinz, "Surface plasmons on smooth and rough surfaces and on gratings," 1988, 2 pages, Springer-Verlag.

Sánchez, Erik J., et al., "Near-field fluorescence microscopy based on two-photon excitation with metal tips," Physical Review Letters, May 17, 1999, pp. 4014-4017, vol. 82, No. 20, The American Physical Society.

Schuck, P. J., et al., "Improving the mismatch between light and nanoscale objects with gold bowtie nanoantennas," Physical Review Letters, Jan. 14, 2005, pp. 017402-1 to 017402-4, vol. 94, The American Physical Society.

Sherry, Leif J., et al., "Localized surface plasmon resonance spectroscopy of single silver nanocubes," Nano Letters, 2005, pp. 2034-2038, vol. 5, No. 10, American Chemical Society.

Sun, Yugang, et al., "Increased sensitivity of surface plasmon resonance of gold nanoshells compared to that of gold solid colloids in response to environmental changes," Analytical Chemistry, Oct. 15, 2002, pp. 5297-5305, vol. 74, No. 20, American Chemical Society.

Sun, Yugang, et al., "Shape-controlled synthesis of gold and silver nanoparticles," Dec. 13, 2002, pp. 2176-2179, vol. 298, Science.

Tam, Felicia, et al., "Geometrical parameters controlling sensitivity of nanoshell plasmon resonances to changes in dielectric environment," J. Phys. Chem. B, 2004, pp. 17290-17294, vol. 108, No. 45, American Chemical Society.

Vinogradov, S. S., et al., "Canonical problems in scattering and potential theory; Part I: Canonical structures in potential theory," 2001, 2 pages, Chapman & Hall/CRC.

Westcott, Sarah L., et al., "Formation and adsorption of clusters of gold nanoparticles onto functionalized silica nanoparticle surfaces," Langmuir, 1998, pp. 5396-5401, vol. 14, No. 19, American Chemical Society.

Xia, Younan, et al., "Shape-controlled synthesis and surface plasmonic properties of metallic nanostructures," www.mrs.org/publications/bulletin, May 2005, pp. 338-348, vol. 30, Mrs. Bulletin.

Xu, Hongxing, et al., "Spectroscopy of single hemoglobin molecules by surface enhanced Raman scattering," Physical Review Letters, Nov. 22, 1999, pp. 4357-4360, vol. 83, No. 21, The American Physical Society.

* cited by examiner

NANORICE PARTICLES: HYBRID PLASMONIC NANOSTRUCTURES

CROSS-REFERENCE TO RELATED APPLICATIONS

This application is a filing under 35 U.S.C. 371 of International Application No. PCT/US2007/063201 filed Mar. 2, 2007, entitled "Nanorice Particles: Hybrid Plasmonic Nanostructures," claiming priority of U.S. Provisional Application Ser. No. 60/779,166 filed Mar. 3, 2006, which applications are incorporated herein by reference in their entirety.

STATEMENT REGARDING FEDERALLY SPONSORED RESEARCH OR DEVELOPMENT

This work was supported by the National Science Foundation (NSF) Grant EEC-0304097, Air Force Office of Scientific Research Grant F49620-03-C-0068, Texas A & M University Grant No. 68371 through pass through funding provided by the National Aeronautics and Space Administration (NASA) Grant 68371 Prime Agency Award No.: NCC-01-0203, Robert A Welch Foundation Grants C-1220 and C-1222, Multidisciplinary University Research Initiative (MURI) funded by the Department of Defense: Army Grant No. W911NF-04-01-0203, and the NSF-funded Integrative Graduate Research and Educational Training (IGERT) program in Nanophotonics funded by the National Science Foundation Grant No. DGE-0504425.

BACKGROUND

1. Field of the Invention

This invention relates to generally to the field of nanoparticles. More specifically, the invention relates to nanorice particles.

2. Background of the Invention

Metals have unusual optical properties and, under reduced dimensionality, can manipulate light in unique ways. The interaction of light with the free electrons in a metal gives rise to collective oscillations of the charge density at optical frequencies, known as surface plasmons. Metallic nanostructures have recently attracted a dramatic increase in attention due to their plasmonic properties, which allows for the development of fundamentally new metal-based subwavelength optical elements with broad technological potential, an emerging field known as plasmonics. Metallic nanostructures possess geometry-dependent localized plasmon resonances, which is one of the major reasons for the growing interest in a rapidly expanding array of metallic nanoparticle geometries, such as nanorods, nanorings, nanocubes, and nanoshells. The resonant excitation of plasmons also leads to large enhancements of the local electromagnetic field at the nanoparticle surface, resulting in dramatically large cross sections for nonlinear optical spectroscopies such as Surface-Enhanced Raman Scattering (SERS). However, designing and fabricating nanostructures that combine highly structurally tunable plasmon resonances with large, well-defined local optical fields remains a formidable task.

Two types of metallic nanostructures that most characteristically illustrate the geometry-dependent plasmon resonant properties of this family of nanoparticles are cylindrical nanoparticles, commonly called nanorods and dielectric core-metal shell nanoparticles, known as nanoshells. Nanorods possess two plasmon resonances corresponding to the oscillation of electrons along the longitudinal and transverse axes of the nanoparticle; by changing the length of the nanorod, the longitudinal plasmon resonance frequency can be systematically tuned. Nanoshells only possess two tunable resonances arising from the hybridization of the plasmons on the inner surface of the shell with the plasmons on the outer shell surface, and can only be tuned by varying the relative size of the inner and outer radius of the metallic shell layer.

Consequently, there is a need for nanoparticles which have improved tunability with well-defined local field enhancement.

BRIEF SUMMARY

A new hybrid nanoparticle, referred to herein as a nanorice particle, that combines the intense local fields of nanorods with the highly tunable plasmon resonances of nanoshells is described herein. This geometry possesses far greater structural tunability than previous nanoparticle geometries, along with much larger local field intensity enhancements and far greater sensitivity as a surface plasmon resonance (SPR) nanosensor than presently known dielectric-conductive material nanostructures. Further features of embodiments of the nanorice particle are described below.

In an embodiment, a nanorice particle comprises a prolate spheroid-shaped core having a first aspect ratio. The nanorice particle also comprises at least one conductive shell surrounding said prolate spheroid-shaped core. The nanorice particle has a surface plasmon resonance sensitivity of at least 600 nm $RIU^{-1}$.

In another embodiment, a nanoparticle comprises an ellipsoidal core coated with at least one conductive shell. The nanoparticle has a local field enhancement of at least 60.

In a further embodiment, a method of making a nanorice particle comprises providing at least one core having a prolate spheroid shape. The method further comprises coupling a plurality of functional groups to the at least one core. The method also comprises coupling a plurality of conductive nanoparticles on to the plurality of functional groups to form at least one seeded core and reducing a conductive material on to the at least one seeded core to make a nanorice particle.

In an embodiment, a method of tuning a surface plasmon property comprising providing a nanoparticle having a prolate spheroid shape, a longitudinal length, and a first aspect ratio. The nanoparticle comprises a prolate spheroid core having a second aspect ratio. The core is surrounded by a conductive layer. The method also comprises adjusting the first aspect ratio, the second aspect ratio, the longitudinal length of the nanoparticle, or the thickness of the conductive layer to tune the surface plasmon property.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

DETAILED DESCRIPTION OF THE PREFERRED EMBODIMENTS

Figure 1:
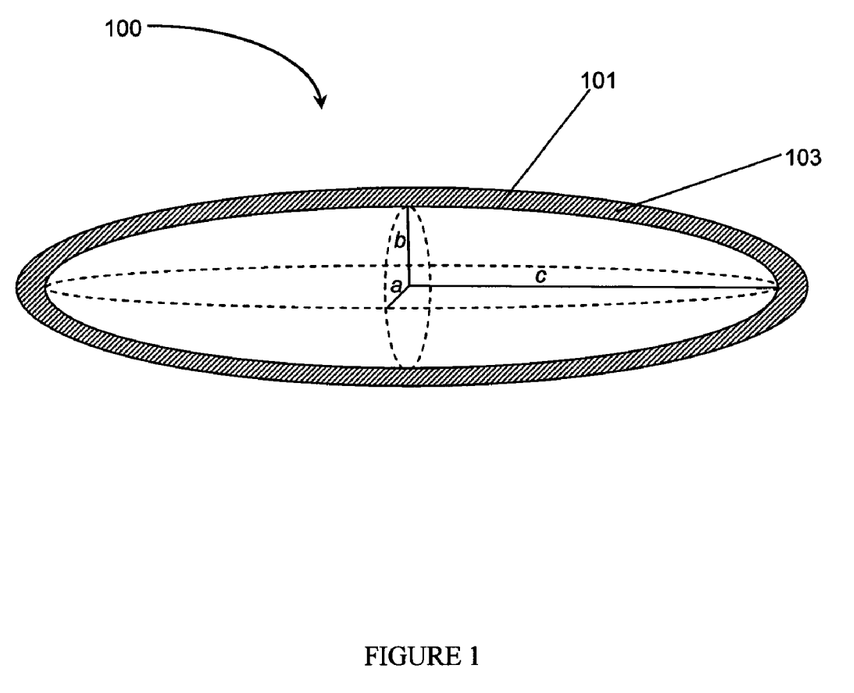
FIG. 1 illustrates an embodiment of a nanorice particle.

FIG. 1 illustrates an embodiment of a nanorice particle 100. Embodiments of the nanorice particle 100 are characterized generally by a novel prolate spheroid or ellipsoid shape (i.e. rice-shaped, cigar-shaped, spindle-shaped, football-shaped, needle-shaped) as shown in FIG. 1. As defined herein, a prolate spheroid or ellipsoid is a body having the dimensions illustrated in FIG. 1, where a and b are the equatorial radii, and c is the polar radius. In a prolate spheroid or ellipsoid, a is equal to b, but a and b are both less than c. When viewed as a transverse cross section, a is the semi-minor axis and c is the semi-major axis, where c is greater than a in an ellipse. The aspect ratio, as defined herein, is the ratio of c to a. In preferred embodiments, core 101 has an aspect ratio of at least 2, preferably at least 3, more preferably at least 4.

Embodiments of the nanorice particles 100 generally are in the nanoscale range i.e. having dimensions no more than 1000 nm. More specifically, nanorice particles may comprise a longitudinal length (twice the length of the semi-major axis, c) ranging from about 10 nm to about 1000 nm, preferably from about 100 nm to about 800 nm, more preferably from about 200 nm to about 500 nm. Furthermore, embodiments of the nanorice particles may comprise a transverse width (twice the length of the semi-minor axis, a) ranging from about 1 nm to about 500 nm, preferably from about 10 nm to about 250 nm, more preferably from about 20 nm to about 100 nm.

Still referring to FIG. 1, in an embodiment, the nanorice particle 100 comprises a prolate spheroid-shaped core 101 coated or surrounded with at least one conductive shell 103. The core may be solid, or alternatively may be hollow or porous. Core 101 of nanorice particle typically comprises a dielectric material. In certain embodiments, core 101 comprises a metal oxide. In one embodiment, core 101 comprises hematite or iron oxide. However, core 101 may comprise any suitable dielectric material. Other examples of suitable core materials include without limitation, iron, cadmium, electric insulators, silicon dioxide, titanium dioxide, polymethyl methacrylate (PMMA), polystyrene, gold sulfide, macromolecules such as dendrimers, or combinations thereof. In certain embodiments, core is comprised of a semiconductor material. For example, without limitation, core may be made of CdSe, CdS or GaAs. In other embodiments, colloidal silica may be the core material.

According to an embodiment, the conductive shell 103 comprises a metallic compound or combination of metallic compounds. However, the core 101 may be coated with any conductive material. In at least one embodiment, the conductive shell 103 comprises gold. Examples of other suitable materials include without limitation, one or more of silver, copper, aluminum, titanium, chromium, or other conductive metals known to those of skill in the art. In further embodiments, core 101 may be surrounded or coated with more than one conductive shell or alternatively a multi-layered shell. Each shell layer may comprise the same material or different materials and may be of the same or different thickness. In a further embodiment, nanorice particle 100 may comprise a non-conductive or dielectric shell layer. The dielectric shell layer may be disposed between conductive shell 103 and core 101. In addition, the dielectric shell later may comprise the same or different thickness than conductive shell 101.

In another embodiment, the aspect ratio of nanorice particle 100 i.e. the outer aspect ratio may be different than the aspect ratio of core 101 i.e. inner aspect ratio, as measured from the outermost radial distance (e.g., semi-minor axis, a, or semi-major axis, c) of the particle 100 and core 101. That is, core 101 may have a different prolate-spheroid shape than the overall nanorice particle 100. In an embodiment, the outer aspect ratio of the nanorice particle 100 is at least about 2, preferably at least about 3, more preferably at least about 4.

The aspect ratio of nanorice particle 100 may be manipulated by changing the thickness of conductive shell 103. In an embodiment, the thickness of the conductive shell is uniform. In another embodiment, the thickness of the shell is non-uniform. For example the thickness of the shell about the equatorial region of the may be greater than the thickness of the shell about the polar regions, thereby changing or manipulating the aspect ratio of the nanorice particle. In embodiments, conductive shell or layer 103 has a thickness ranging from about 1 nm to about 100 nm, preferably from about 5 nm to about 50 nm, more preferably from about 10 nm to about 40 nm.

It has been found that nanorice particles exhibit superior longitudinal plasmon resonance characteristics. As defined herein, surface plasmons are surface electromagnetic waves that propagate along a metal interface. Surface plasmon resonance (SPR) is a phenomenon where light is absorbed or scattered due to excitation of the surface plasmons. The "coupling" of the light to the surface plasmons causes the electromagnetic field of the light to be significantly enhanced, also known as local field enhancement.

Figure 4:
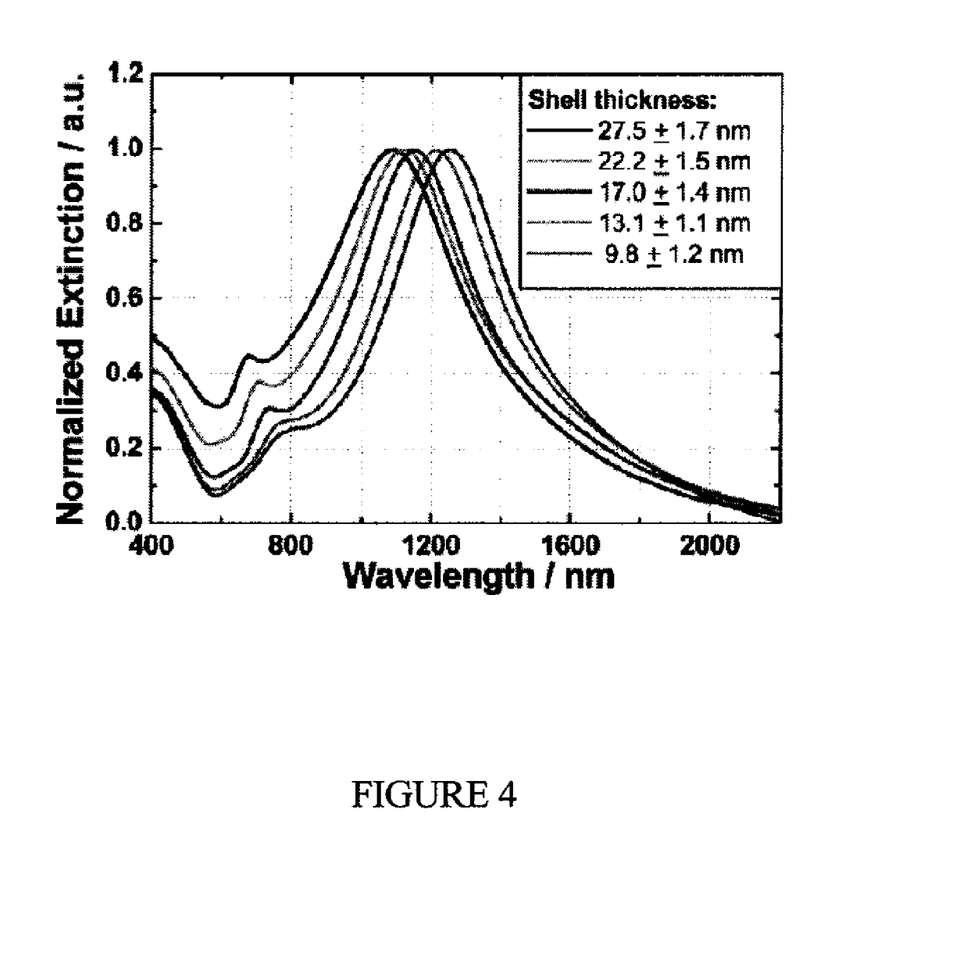
FIG. 4 is a plot of the extinction spectra of nanorice particles with different shell thicknesses.
Figure 5:
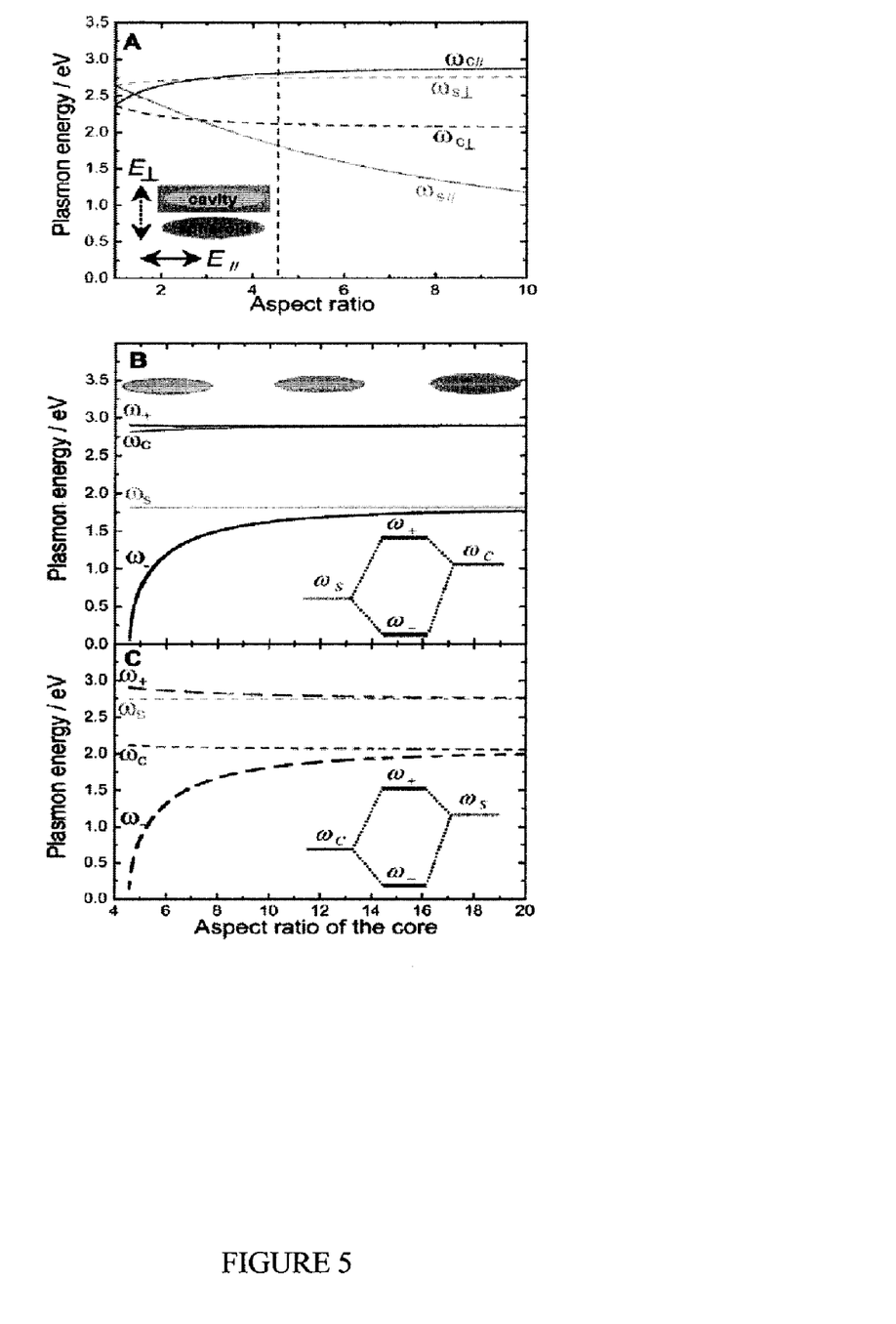
FIG. 5A is a plot of plasmon energy vs. aspect ratio (major radius/minor radius) of the solid prolate spheroid and prolate cavity. The solid lines refer to longitudinal polarization, and the dashed lines refer to transverse polarization.
FIGS. 5B-C are plots of (B) longitudinal and (C) transverse plasmon energies vs. core aspect ratio of a nanorice particle. The orange and blue lines indicate the relevant plasmon energies of the solid prolate spheroid and the prolate cavity modes, respectively. The black and green lines refer to bonding ($\omega_-$) and antibonding ($\omega_+$) plasmons, respectively.

In particular, embodiments of the nanorice particles allow for finer or increased tunability of surface plasmon resonance. As described above, in comparison to other geometries such as nanorods or spheres, nanorice particles have at least three parameters for increased tunability of surface plasmon resonance. Specifically, these parameters are the aspect ratio of core 101, the thickness of the at least one conductive shell 103, and the overall or outer aspect ratio of the nanorice particle 100. The greater number of parameters allows for finer tuning of surface plasmon resonance characteristics such as without limitation, the surface plasmon resonance wavelength. For example, in an embodiment, the conductive shell thickness may be adjusted to change the surface plasmon resonance as shown in FIG. 4. In another embodiment, the conductive shell thickness may be varied to adjust the surface plasmon resonance sensitivity as shown in FIG. 5. In other embodiments, the aspect ratio of the core 101 or the overall aspect ratio of the nanoparticle 100 may by adjusted while keeping the aspect ratio of the nanoparticle 100 constant to tune the surface plasmon resonance.

In yet a further embodiment, the overall size of the nanorice particles may be increased or decreased to tune the surface plasmon characteristics. That is, the longitudinal length of each nanoparticle may be adjusted while keeping the core aspect ratio, overall aspect ratio constant, and conductive layer thickness constant. Thus, for exemplary purposes only, as longitudinal length of the nanoparticle is increased, the transverse width of the nanoparticle is also correspondingly increased. In other embodiments, the longitudinal length and transverse width (i.e. overall size) of the core 101 is correspondingly adjusted with adjustment of the overall size of each nanorice particle in order to maintain shell thickness. However, it is envisioned that all of the above parameters may be manipulated to provide precise control of the surface plasmon characteristics as desired.

The plasmon resonance of nanorice particles may be understood by applying the plasmon hybridization model to the disclosed prolate spheroidal geometry. The sphere-cavity model for spherical nanoshells can be generalized to describe the plasmon resonances of embodiments of the nanorice particle, as the hybridization between plasmon modes of a solid prolate spheroid and an ellipsoidal cavity inside a continuous conductive shell. See Example 3, infra. Without being bound by theory, it is believed that as the aspect ratio of the core 101 is decreased, the hybridization between the cavity and spheroid modes becomes progressively stronger resulting in larger energy gaps between the bonding and antibonding plasmon modes.

Figure 3:
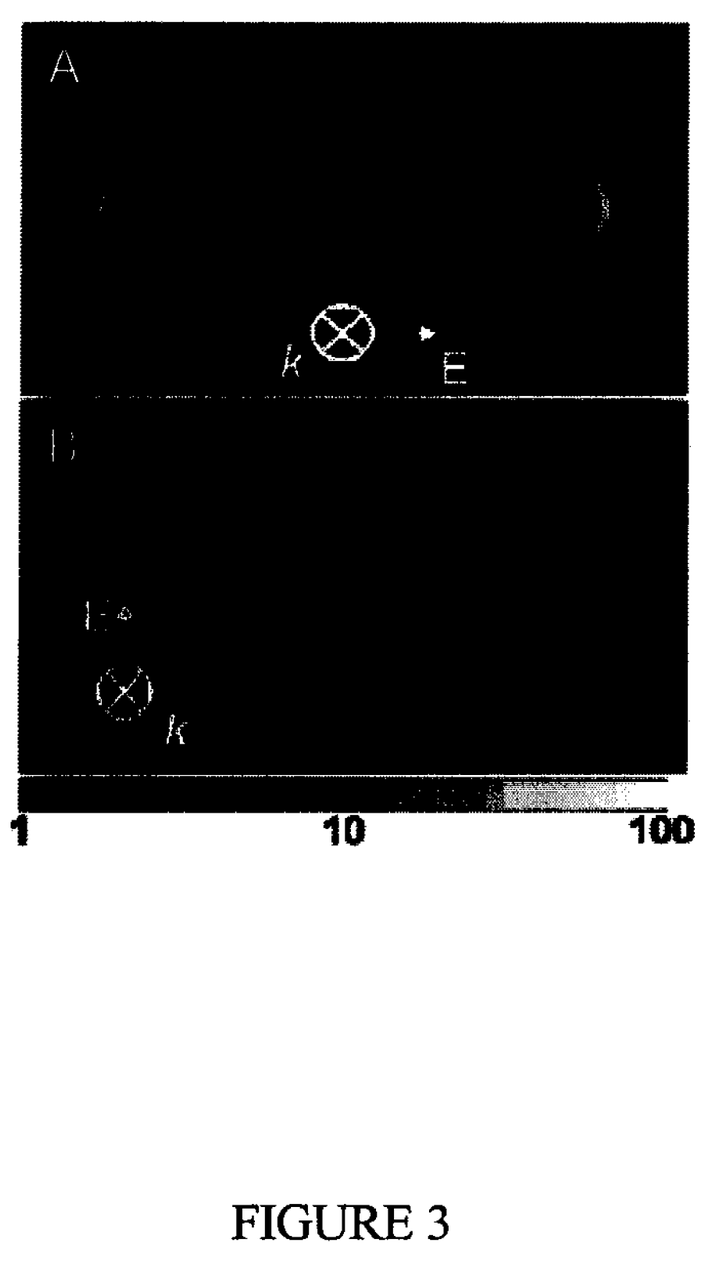
FIGS. 3A-B illustrate the local field distribution corresponding to the (A) longitudinal plasmon resonance and the (B) transverse plasmon resonance.

Furthermore, embodiments of the nanorice particles present increased local field enhancement due to the shape of the particles as shown in FIG. 3. In other words, the electromagnetic field enhancement of incident light at the nanoparticle surface due to surface plasmon excitation is significantly increased because of its prolate-spheroid shape. The local field enhancement may be quantified as the amplification of the incident light field directed at the nanorice particle. In embodiments, each individual nanorice particle exhibits a local field enhancement of at least about 60, preferably at least about 70, more preferably at least about 80. In another embodiment, each individual nanorice particle exhibits a local field intensity enhancement of at least 3,000, preferably at least about 4,000, more preferably at least about 6,000, where local field intensity enhancement is the square of the local field enhancement. The distribution of the local field enhancement may be determined by numerical methods such as finite difference time domain (FDTD) analysis as is well known in the art. See C. Oubre et al., 108 J. Phys. Chem. B. 17740 (2004), herein incorporated by reference. However, other numerical methods may also be used to determine the local field intensities of each nanorice particle.

Furthermore, the local field enhancement of the nanorice particles has been found to extend away from the surface of the nanoparticles. See FIG. 3. Thus, in certain embodiments, each nanorice particle has a local field enhancement that extends a distance ranging from about 5 nm to about 80 nm away from the surface of the nanorice particle, preferably from about 10 nm to about 60 nm, more preferably from about 30 nm to about 50 nm.

The strong local field enhancement in embodiments of the nanorice particles may be especially useful for Surface Enhanced Raman Spectroscopy (SERS). Raman scattering or the Raman effect is the inelastic scattering of a photon. When light is scattered from an atom or molecule, most photons are elastically scattered (Rayleigh scattering). The scattered photons have the same energy (frequency) and, therefore, wavelength, as the incident photons. However, a small fraction of scattered light (approximately 1 in 1000 photons) is scattered from excitations with optical frequencies different from, and usually lower than, the frequency of the incident photons.

In SERS, the Raman effect may be greatly enhanced when it is close to embodiments of the nanorice particles. The mechanism by which the enhancement of the Raman signal is provided is from the local electromagnetic field enhancement provided by the nanorice particles. The enhancement may significantly increase the sensitivity of the Raman spectroscopy technique. Thus, in one embodiment, each nanorice particle may serve as a standalone, optically addressable nanoscale substrate for spectroscopy techniques such as SERS.

Another application of the strong local field enhancement of the nanorice particles is in photothermal cancer therapy. A plurality of nanorice particles may be deposited or injected at a tumor or cancerous site. The nanorice particles may be functionalized with targeting molecules such as without limitation, peptides, proteins, ligands, antibodies, or combinations thereof. The tunability of the nanorice particles allows the surface plasmon resonance to be tuned to the near-infra red (near-IR) region. A light such as a laser at the plasmon resonant frequency of the nanorice particles may be directed at the nanorice particles. The strong local field enhancement causes intense localized heating and the destruction of the cancer cells.

In addition, embodiments of the nanorice particles possess very high surface plasmon resonance (SPR) sensitivity. As defined herein, the SPR sensitivity is the SPR wavelength shift measured as a function of the refractive index of the medium surrounding the nanorice particles. SPR sensitivity is measured with units of nm $RIU^{-1}$ (Refractive Index Unit). In an embodiment, the SPR sensitivity may be determined by exposing a monolayer of nanorice particles on a polymer coated glass slide to solvents with varying refractive indices. In one embodiment, the glass slide is coated with polyvinyl pyrilidinone (PVP). However, other polymers known to those of skill in the art may be coated on to the glass slide. The extinction spectra of the monolayer is taken using a UV-vis near-IR spectrometer. SPR sensitivity is measured with units of nm $RIU^{-1}$ (Refractive Index Unit). In embodiments, the nanorice particles have a SPR sensitivity ranging from about 100 nm $RIU^{-1}$ to about 1500 nm $RIU^{-1}$, preferably from about 300 nm $RIU^{-1}$ to about 1200 nm $RIU^{-1}$, more preferably from about 600 nm $RIU^{-1}$ to about 1000 nm $RIU^{-1}$.

Figure 2:
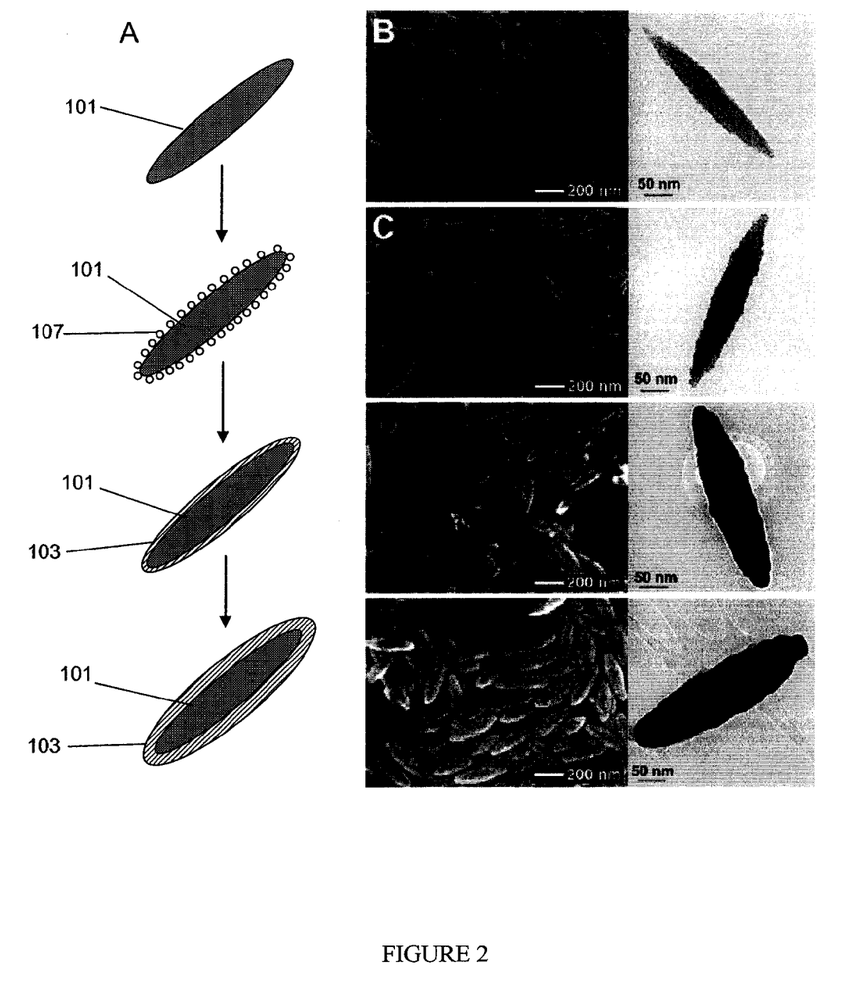
FIG. 2A illustrates a schematic of an embodiment of a method of making a nanorice particle.
FIG. 2B illustrates scanning electron microscope (SEM) images (left) and transmission electron microscope (TEM) images (right) of the prolate spheroid core particles.
FIG. 2C illustrates SEM and TEM images of the seeded core particles.
FIG. 2D illustrates SEM and TEM images of the nanorice particles with thin shells (13.1±1 nm)
FIG. 2E illustrates SEM and TEM images of the nanorice particles with thick shells (27.5±1.7 nm)

In another embodiment, a method of making nanorice particles generally involves metallizing prolate spheriod-shaped cores as depicted in FIG. 2. According to one embodiment, the prolate spheroid-shaped cores 101 are made or fabricated by hydrolysis of ferric salt solutions. See M. Ozaki et al., 102 J. Colloid Interface Science 146-151 (1984), herein incorporated by reference. Examples of ferric salts include without limitation, ferric chloride ($FeCl_3$), $Fe(NO_3)_3$, ferric sulfate, or combinations thereof. In a particular embodiment, a solution of ferric chloride with a dihydrogen phosphate such as without limitation, potassium dihydrogen phosphate or sodium dihydrogen phosphate, may be aged for a set period of time to form the prolate spheriod-shaped core particles. In other embodiments, ferric chloride is aged with a hydrogen phosphite such as without limitation, $NaH_2PO_2$. In an embodiment, the concentration of the ferric salt solution ranges from about 0.005 M to about 0.05 M while the concentration of the dihydrogen phosphate ranges from about $1.0\times10^{-4}$ M to about $5.0\times10^{-4}$ M. The solution may be aged at a temperature ranging from about 50° C. to about 150° C. for a time period ranging from about 12 hours to about 96 hours. The formed cores may then be washed one or more times with water or ethanol and then dispersed in solution. In other embodiments, core 101 may be fabricated by photolithography techniques.

After prolate-spheroid shaped cores have been obtained or fabricated, core 101 may be functionalized with an organosilane compound. Examples of organosilanes include without limitation, (3-aminopropyl) trimethoxysilane (APTMS), aminopropyltriethoxy silane (APTES), mercaptopropyltrimethoxysilane, 4-aminobutyldimethoxysilane, and the like. Conductive nanoparticles 107 may then be immobilized or coupled to core 101 to form a seeded core 101. Generally, the conductive nanoparticles comprise colloidal metal nanoparticles such as gold colloids. However, any suitable conductive nanoparticle may be used. In an embodiment, conductive nanoparticles are immobilized or seeded onto the surface of functionalized cores with a nominal coverage of at least about 10% of the core surface, preferably at least about 20% of the core surface, preferably at least about 30% of the core surface as shown in FIG. 2.

Without being limited by theory, it is believed that the immobilized conductive nanoparticles 107 act as nucleation sites for electroless plating of a conductive material onto the surface of core particles, leading to the gradual formation of a continuous and complete conductive shell layer 103. In an embodiment, coating or plating the conductive material on to the core comprises the catalyzed reduction of a conductive metal. In an embodiment, the conductive metal is reduced by formaldehyde in an aqueous solution. Alternatively, the conductive metal may be reduced with hydroxylamine hydrochloride or sodium borohydride. The coating methods are similar to the metallization procedure used in metal nanoshell synthesis, and shows that this approach is adaptable to produce uniform metallization layers on the surfaces of other oxide nanoparticles. See Oldenburg et al., U.S. Pat. No. 6,685,986, herein incorporated by reference. Further metal deposition onto the nanostructure increases the thickness of the metal layer.

In embodiments, the nanorice particles may be homogeneously dispersed in solvents such as water and ethanol to form colloidal solutions, added to polymeric or organic media, or dispersed and immobilized on polyvinylpyridine (PVP) coated substrates as individual, randomly oriented nanoparticles.

To further illustrate various illustrative embodiments of the present invention, the following examples are provided.

EXAMPLE 1

Nanorice Particle Fabrication

Materials

Ferric chloride, (3-aminopropyl)trimethoxysilane, tetrachloroauric acid, tetrakis hydroxymethyl phosphonium chloride were purchased from Sigma-Alrdrich (St. Louis, Mo.). 37% formaldehyde, potassium dihydrogen phosphate and 200 proof ethanol were obtained from Fisher Scientific (Hampton, Mass.). All the chemicals were used as received without further purification. Ultrapure water (18.2 MO resistivity) was obtained from a Milli-Q water purification system.

Nanorice Particle Fabrication

Monodisperse spindle-shaped hematite particles were fabricated by forced hydrolysis of ferric chloride solutions. Hematite particles with aspect ratio of 6.3 (340 nm×54 ml) were prepared by aging 100 mL of aqueous solution containing $2.0\times10^{-2}$ M $FeCl_3$ and $4.0\times10^{-4}$ M $KH2PO_4$ at 10° C. for 72 hours. The resulting precipitate was centrifuged and washed several times with water and ethanol. The precipitate was finally dispersed in 25 mL of ethanol.

The surface of the hematite particles as functionalized with APTMS to generate an amine moiety surface. 600 μL APTMS was introduced into a 5 mL solution of the hematite particles dissolved in ethanol. The mixture was stirred for 12 hours. The functionalized particles were then centrifuged and redispersed in ethanol to remove excess APTMS. THPC-capped gold nanoparticles were prepared using Duff's method (see D. G. Duff et al., 9 Langmuir, 2301-2309 (1993), herein incorporated by reference), and then attached to the functionalized hematite particle surface through gold-amine interactions.

As described above, the attached Au colloids acted as nucleation sites for the reduction of Au ions from solution on to the core surface until continuous and complete gold nanorice particles were formed. Gold was coated on to the seeded nanorice particles by seed-catalyzed reduction of $AuCl_4^-$ ions by formaldehyde in aqueous solution at room temperature. See Oldenburg et al., U.S. Pat. No. 6,685,986, herein incorporated by reference. The growth of complete gold shells typically took 5-10 minutes. In addition, the thickness of the gold shell layer was controlled by adjusting the ratio between the seed particles and the $AuCl_4^-$ ions. Nanorice particles with shell thicknesses ranging from about 8 nm to about 30 nm were fabricated. The extinction spectra of nanorice particles with different shell thickness is shown in FIG. 4. Extinction spectra were obtained using a Cary 5000 UV/vis/NIR (Ultra-violet/visible/near-infrared) spectrophotometer in the wavelength range of 400 ml to 2400 nm.

Scanning electron microscope images were obtained on a Phillips FEEI XL-30 environmental at an acceleration voltage of 30 kV. The samples for SEM measurements were prepared by drop of colloidal solution on silicon wafer surface under ambient air. TEM images were obtained using a JEOL JEM-2010 transmission electron microscope.

EXAMPLE 2

Nanorice Particle Film Fabrication and Determination of SPR Sensitivity

Nanorice films were prepared by immobilizing nanorice particles on PVP-coated substrates. Briefly, glass slides were cleaned in piranha solution (sulfuric acid:hydrogen peroxide) and immersed in a 1 wt % solution of PVP in ethanol for 24 hours. The slides were rinsed thoroughly with ethanol and dried with $N_2$ gas. The PVP-functionalized slides were immersed in an aqueous solution of nanorice for 1 hour. Upon removal from the nanorice solution, the films were rinsed with ethanol and dried with $N_2$. This resulted in a monolayer of isolated nanorice particles with random orientations.

Figure 6A:
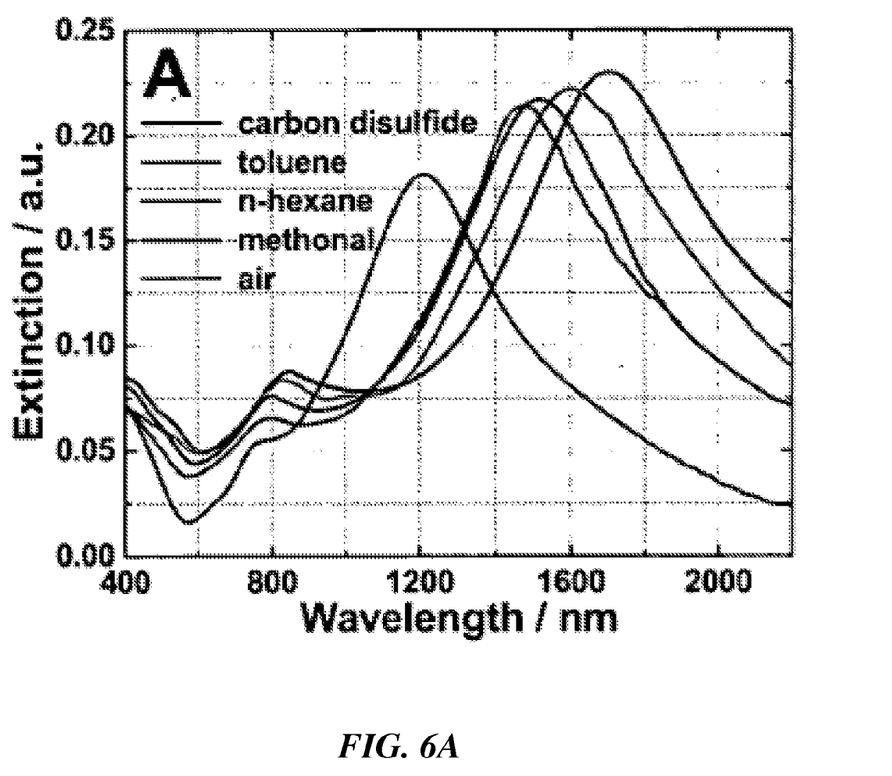
FIG. 6A is a plot the extinction spectra of a nanorice particle as a function of solvent.
Figure 6B:
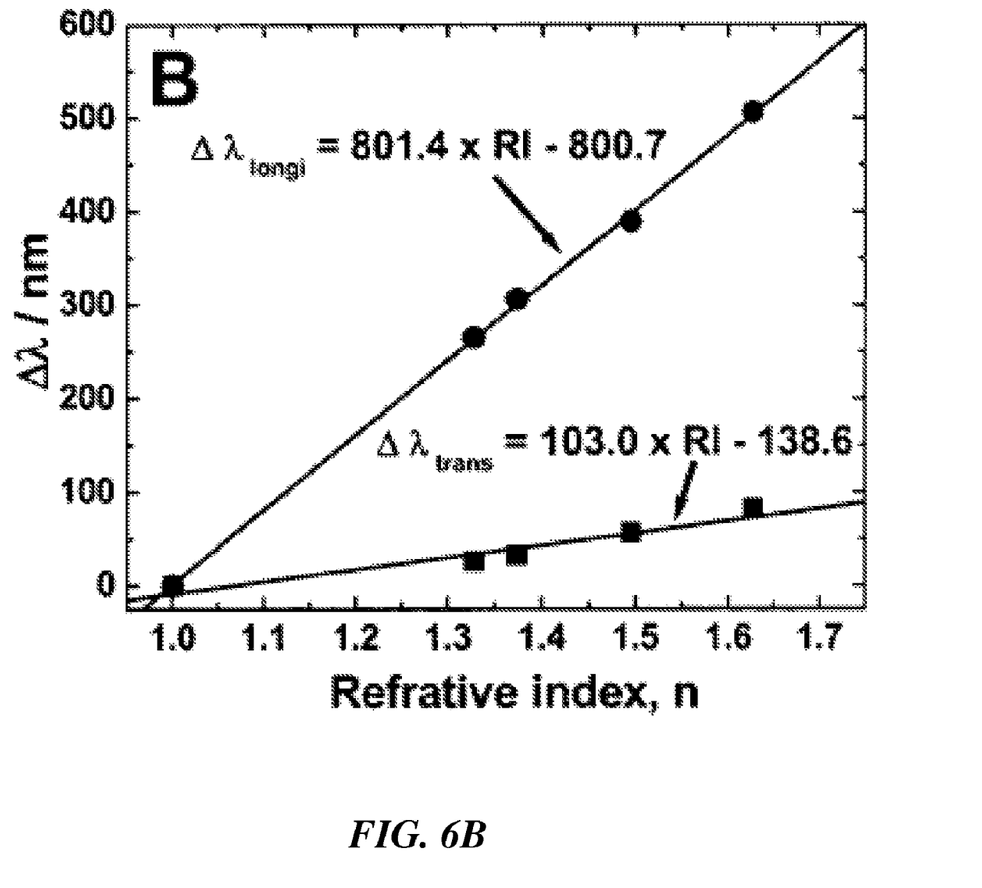
FIG. 6B is a plot of the shift of the longitudinal and transverse plasmon energies as a function of the solvent refractive index.

The monolayer of nanorice particles was exposed to solvents with varying refractive indices. The following solvents were used as shown in FIG. 6A: carbon disulfide, toluene, n-hexane, methanol, and air. FIG. 6A shows the extinction spectra of the monolayer films of nanorice particles immersed in the different solvents. The resulting plasmon resonance shifts were plotted versus the refractive index of the solvent in FIG. 6B.

EXAMPLE 3

Dependence of Plasma Resonance on Nanorice Particle Geometry Using the Plasma Hybridization Model The plasmon hybridization model was applied to the disclosed prolate spheroidal geometry to examine the plasmon resonance of the nanorice particles. The sphere-cavity model for spherical nanoshells was generalized to describe the plasmon resonances of embodiments of the nanorice particle, as the hybridization between plasmon modes of a solid prolate spheroid and an ellipsoidal cavity inside a continuous conductive shell. The scalar potential used in the plasma hybridization model is described in the form:

$$\eta = \Sigma[\dot{S}_{lm}(t)P_{lm}(\cos h\alpha) + \dot{C}_{lm}(t)Q_{lm}(\cos h\alpha)]P_{lm}(\cos \beta)e^{im\phi}$$

where $S_{lm}$ is the amplitude of the primitive plasmons of the solid particle, and $C_{lm}$ is the amplitude of the primitive plasmons of a cavity. $P_{lm}$ and $Q_{lm}$ are the associated Legendre first and second order polynomials. The aspect ratio of the prolate spheroid is taken as $\coth \alpha$.

For a solid prolate spheroidal particle consisting of a metal with an electron density corresponding to a bulk plasmon frequency $\omega_B$, a metallic background polarizability of $\in_S$, immersed in a dielectric with permittivity $\in_E$, $\cos h \alpha = \sin \alpha/\coth \alpha$, the energies of the plasmon modes take the form:

$$\omega_{S,lm}^2(\alpha) = \omega_B^2 \frac{P'_{lm}(\cosh\alpha)Q_{lm}(\cosh\alpha)}{\varepsilon_S P_{lm}(\cosh\alpha)Q_{lm}(\cosh\alpha) - \varepsilon_E P_{lm}(\cosh\alpha)Q'_{lm}(\cosh\alpha)}. \quad (1)$$

For a prolate dielectric cavity of aspect ratio $\coth \alpha$ filled with a dielectric medium of permittivity $\omega_C$ in the same metallic material, the plasmon energies are:

$$\omega_{C,lm}^2(\alpha) = \omega_B^2 \frac{P_{lm}(\cosh\alpha)Q'_{lm}(\cosh\alpha)}{\varepsilon_S P_{lm}(\cosh\alpha)Q'_{lm}(\cosh\alpha) - \varepsilon_C P'_{lm}(\cosh\alpha)Q_{lm}(\cosh\alpha)}. \quad (2)$$

Using the above equations, the plasmon energy as a function of aspect ratio may be calculated and are shown in FIG. 5A. In FIG. 5A, the dependence on aspect ratio of the transverse and longitudinal plasmon resonances of an Au nanorod, modeled as a prolate spheroid Eq. (1), and that of an elliptical dielectric cavity embedded in an infinite Au volume Eq. (2) is shown. Each of these nanostructures supports longitudinal and transverse plasmon resonances strongly dependent upon aspect ratio, where an aspect ratio of 1 corresponds to the spherical particle and cavity case. The cavity plasmon described here corresponds to a void filled with a dielectric medium of dielectric constant $\epsilon_c$=9.5, that of hematite. FIGS. 5B-C show the variation of nanorice particle resonances when the aspect ratio of the core is varied while the overall particle size and aspect ratio of the nanoparticle are held constant, for the longitudinal (FIG. 5B) and transverse (FIG. 5C) resonances of the nanostructure. The nanorice particle was made up of a metal with a bulk plasmon frequency of 8.95 eV and a core dielectric of 9.5. The aspect ratio of the nanorice particle was held constant at 4.575.

While embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A nanoparticle comprising:
   a prolate spheroid-shaped core having a first aspect ratio, wherein said prolate spheroid-shaped core comprises hematite; and
   at least one conductive shell surrounding said prolate spheroid-shaped core, wherein said nanoparticle has a surface plasmon resonance sensitivity of at least 600 nm $RIU^{-1}$.

2. The nanoparticle of claim 1, wherein said first aspect ratio of said prolate spheroid-shaped core is at least 3.

3. The nanoparticle of claim 1, wherein said nanoparticle has an aspect ratio different than said first aspect ratio of said prolate spheroid-shaped core.

4. The nanoparticle of claim 3, wherein said nanoparticle has an aspect ratio of at least 4.

5. The nanoparticle of claim 1, wherein said nanoparticle has a longitudinal length ranging from about 100 nm to about 1000 nm.

6. The nanoparticle of claim 1, wherein said at least one conductive shell comprises a thickness ranging from about 1 nm to about 100 nm.

7. The nanoparticle of claim 1, wherein said at least one conductive shell comprises a metal.

8. The nanoparticle of claim 7, wherein said metal comprises gold, silver, copper, titanium, palladium, platinum, aluminum, or combinations thereof.

9. The nanoparticle of claim 1, comprising more than one conductive shell.

10. The nanoparticle of claim 1, further comprising at least one dielectric shell surrounding said core.

11. The nanoparticle of claim 1, wherein said at least one dielectric shell is disposed between said core and said at least one conductive shell.

12. The nanoparticle of claim 1, wherein said nanoparticle has a local field enhancement of at least 60.

13. The nanoparticle of claim 1, wherein said nanoparticle has a local field enhancement of at least 80.

14. The nanoparticle of claim 1, wherein said local field enhancement extends at least 30 nm beyond the surface of said nanoparticle.

15. A method of making a nanoparticle comprising:
a) providing at least one core having a prolate spheroid shape, wherein the core is provided by hydrolyzing a ferric salt solution at a temperature of at least 100° C.;
b) coupling a plurality of functional groups to the at least one core;
c) coupling a plurality of conductive nanoparticles on to the plurality of functional groups to form at least one seeded core; and
d) reducing a conductive material on to the at least one seeded core to form a conductive shell and make the nanoparticle.

16. The method of claim 15, wherein the ferric salt solution comprises ferric chloride.

17. The method of claim 15, wherein (a) comprises hydrolyzing the ferric salt solution with a dihydrogen phosphate.

18. The method of claim 15, wherein (a) further comprises aging the ferric salt solution and the dihydrogen phosphate for a time period ranging from about 12 hours to about 96 hours.

19. The method of claim 15, wherein (b) comprises mixing the at least one core with an organosilane compound.

20. The method of claim 19, wherein the organosilane compound comprises (3-aminopropyl)trimethoxysilane.

21. The method of claim 15, wherein the plurality of conductive nanoparticles comprise gold nanoparticles.

22. The method of claim 15, wherein (d) comprises reducing gold ions on to the plurality of seeded gold in the presence of formaldehyde.

23. The nanoparticle of claim 1, wherein an outer aspect ratio of the nanoparticle is at least about 2.

24. The nanoparticle of claim 1, wherein said nanoparticle has a local field enhancement of at least 3000.

25. The nanoparticle of claim 24, wherein said local field enhancement extends from about 5 nm to about 80 nm beyond the surface of said nanoparticle.

26. The method of claim 19, wherein the organosilane compound comprises (3-aminopropyl) trimethoxysilane, aminopropyltriethoxy silane, mercaptopropyltrimethoxysilane, 4-aminobutyldimethoxysilane, or combinations thereof.

27. The method of claim 15, wherein (a) further comprises washing the cores.

28. The method of claim 27, wherein the cores are washed with methanol or ethanol.

29. The method of claim 15, wherein the plurality of conductive nanoparticles provides nominal coverage of at least 10% of the core surface.

30. The method of claim 15, wherein reducing the conductive material comprises contacting the conductive material with hydroxylamine or sodium borohydride.

31. The method of claim 15, further comprising dispersing the nanoparticle in a solvent to form a colloidal suspension.

32. The method of claim 15, further comprising immobilizing the nanoparticle.

* * * * *

UNITED STATES PATENT AND TRADEMARK OFFICE
CERTIFICATE OF CORRECTION

PATENT NO. : 7,790,066 B2
APPLICATION NO. : 12/281103
DATED : September 7, 2010
INVENTOR(S) : Hui Wang et al.

Page 1 of 1

It is certified that error appears in the above-identified patent and that said Letters Patent is hereby corrected as shown below:

In column 1, lines 17-29, replace

"This work was supported by the National Science Foundation (NSF) Grant EEC-0304097, Air Force Office of Scientific Research Grant F49620-03-C-0068, Texas A & M University Grant No. 68371 through pass through funding provided by the National Aeronautics and Space Administration (NASA) Grant 68371 Prime Agency Award No.: NCC-01-0203, Robert A Welch Foundation Grants C-1220 and C-1222, Multidisciplinary University Research Initiative (MURI) funded by the Department of Defense: Army Grant No. W911NF-04-01-0203, and the NSF-funded Integrative Graduate Research and Educational Training (IGERT) program in Nanophotonics funded by the National Science Foundation Grant No. DGE-0504425."

with

--This invention was supported by Robert A. Welch Foundation Grants C-1220 and C-1222 and was made with government support under Grant Number EEC-0304097 awarded by the National Science Foundation (NSF), Grant Number F49620-03-C-0068 awarded by the Air Force Office of Scientific Research, Texas A & M University Grant Number 68371 through pass through funding provided by Prime Agency Award Number NCC-01-0203 awarded by the National Aeronautics and Space Administration (NASA), Army Grant Number W911NF-04-01-0203 awarded by the Multidisciplinary University Research Initiative (MURI) funded by the Department of Defense, and Grant Number DGE-0504425 awarded by the NSF-funded Integrative Graduate Research and Educational Training (IGERT) program in Nanophotonics funded by the National Science Foundation (NSF). The government has certain rights in the invention.--

Signed and Sealed this
Twenty-seventh Day of September, 2011

David J. Kappos
*Director of the United States Patent and Trademark Office*